(12) United States Patent
Nakanishi et al.

(10) Patent No.: US 6,341,106 B1
(45) Date of Patent: Jan. 22, 2002

(54) OPTICAL DISC DRIVE

(75) Inventors: Ryoichi Nakanishi; Hiroshi Nishikawa, both of Saitama-ken; Suguru Takishima; Shimpei Shinozaki, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,202

(22) Filed: Nov. 4, 1998

(30) Foreign Application Priority Data

Nov. 5, 1997 (JP) .............................. 9-318995
Nov. 8, 1997 (JP) .............................. 9-322421

(51) Int. Cl.[7] ................................. G11B 7/00
(52) U.S. Cl. .............................. 369/44.28; 369/44.23; 369/44.32
(58) Field of Search ................. 369/44.28, 13, 369/112.24, 119, 44.23, 44.32, 44.37, 44.41, 112.27, 112.29, 44.19, 112.28, 44.36

(56) References Cited

U.S. PATENT DOCUMENTS

| 2,750,461 A | 6/1956 | Bunch | 200/61.13 |
|---|---|---|---|
| 3,244,917 A | 4/1966 | Gute | 310/154 |
| 3,354,833 A | 11/1967 | Laing | 417/353 |
| 4,088,914 A | 5/1978 | Aoki | 310/264 |
| 4,126,796 A | 11/1978 | Ito | 310/4 MM |
| 4,206,379 A | 6/1980 | Owda | 310/156 |
| 4,285,566 A | 8/1981 | Yamamoto | 359/214 |
| 4,297,713 A | 10/1981 | Ichikawa et al. | 347/257 |
| 4,466,088 A | 8/1984 | Trethewey | 369/44.14 |
| 4,761,774 A | * 8/1988 | Ishibashi et al. | 369/44.19 |
| 4,891,998 A | 1/1990 | Tourville | 74/48 |
| 4,959,824 A | 9/1990 | Ueda | 369/44.14 |

(List continued on next page.)

FOREIGN PATENT DOCUMENTS

| EP | 0084727 | 8/1983 |
|---|---|---|
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |

(List continued on next page.)

OTHER PUBLICATIONS

Patent Abstracts of Japan, vol. 012, No. 140 (P–696), dated Apr. 18, 1988; JP–62262017.
Patent Abstracts of Japan, vol. 017, No. 505 (P–1611), dated Sep. 10, 1993.; JP–05128561.
An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese language magazine *Nikkei Electronics*.

(List continued on next page.)

*Primary Examiner*—David Hudspeth
*Assistant Examiner*—Kim-Kwok Chu
(74) *Attorney, Agent, or Firm*—Greenblum & Bernstein, P.L.C.

(57) ABSTRACT

Disclosed is an optical disc drive. The optical disc drive is provided with an arm member carrying an objective optical system and a light emitting system. The arm member is rotatable about an axis at one end portion thereof. On the other end portion of the arm member, the objective optical system is mounted. A detecting system is further provided for receiving light reflected by the optical disc via the objective optical system. The detecting system detects data related to an orientation of a beam spot formed by the reflected beam on its light receiving surface. Further provided is a control system which determines a current position of the arm member based on the data related to the orientation of the beam spot.

8 Claims, 11 Drawing Sheets

U.S. PATENT DOCUMENTS

| | | | |
|---|---|---|---|
| 4,968,876 A | 11/1990 | Iima | 250/216 |
| 5,125,750 A | 6/1992 | Corle et al. | |
| 5,126,899 A | 6/1992 | Kanazawa | 360/99.07 |
| 5,136,559 A | 8/1992 | Nakayama | 369/32 |
| 5,151,890 A | 9/1992 | Yonekubo | 369/44.11 |
| 5,220,550 A | 6/1993 | Nakayama | 369/44.14 |
| 5,254,893 A | 10/1993 | Ide | 310/90 |
| 5,365,504 A | 11/1994 | Noguchi | 369/44.41 |
| 5,420,848 A | 5/1995 | Date et al. | 369/53.25 |
| 5,422,872 A | 6/1995 | Hsu et al. | 369/97 |
| 5,444,683 A | 8/1995 | Ishikawa | 369/44.28 |
| 5,461,498 A | 10/1995 | Iwao | 359/200 |
| 5,517,474 A | 5/1996 | Takamine | 369/44.32 |
| 5,532,480 A | 7/1996 | Scofield | 250/235 |
| 5,564,585 A | 10/1996 | Saitoh | 220/241 |
| 5,596,446 A | 1/1997 | Plesko | 359/214 |
| 5,608,280 A | 3/1997 | Tamemoto et al. | 310/239 |
| 5,610,752 A | 3/1997 | Hayakawa | 359/198 |
| 5,625,244 A | 4/1997 | Bradfield | 310/232 |
| 5,684,762 A | 11/1997 | Kubo | 369/13 |
| 5,705,868 A | 1/1998 | Cox et al. | 310/71 |
| 5,719,834 A | 2/1998 | Futagawa et al. | 369/44.14 |
| 5,764,613 A | 6/1998 | Yamamoto | 369/112.24 |
| 5,768,241 A | 6/1998 | Kanazawa et al. | 369/77.2 |
| 5,844,676 A | 12/1998 | Southam et al. | 356/237.1 |
| 5,854,780 A * | 12/1998 | Opheij et al. | 369/44.23 |
| 5,886,438 A | 3/1999 | Kawanishi | 310/90 |
| 5,920,140 A | 7/1999 | Nakagishi et al. | 310/219 |
| 6,055,222 A * | 4/2000 | Knight | 369/13 |
| 6,061,323 A * | 5/2000 | Jerman et al. | 369/13 |

FOREIGN PATENT DOCUMENTS

| | | |
|---|---|---|
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/08363 | 7/1990 |
| WO | 98/06095 | 2/1998 |
| WO | 98/19684 | 11/1998 |
| WO | 98/49675 | 11/1998 |

OTHER PUBLICATIONS

An article entitled "Trillions Of Bytes", by Eric Nee, which appeared in the Mar. 24, 1997 issue of Forbes magazine.

An article entitled "In 1998, 10 GB Per Inch$^2$ Is Realized Using New Optical Recording Technology", appeared at pp. 148–151 of the Sep., 1997 Japanese language edition of Nikkei Byte magazine.

B.D. Terris et al., "Near–Field Optical Data Storage", Applied Physics Letters, vol. 68, pp. 141–143, Jan. 8, 1996.

* cited by examiner

OPTICAL DISC DRIVE

BACKGROUND OF THE INVENTION

The present invention relates to an optical system to be employed in an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In an example of such an optical disc drive, an objective optical system is mounted on an arm which is movable in a transverse direction of tracks formed on an optical disc for rough tracking. Firstly, the rough tracking is performed to locate the optical head in the vicinity of the track.

Then, by changing incident angle of a beam incident on the objective optical system is controlled to locate a spot of beam formed by the objective optical system for fine tracking, with use of a galvano mirror or the like. During the fine tracking operation, the beam spot is accurately located on one of the tracks whose pitch is, for example, 0.34 $\mu$m.

In the optical disc drive as described above, when the rough tracking is performed, the number of tracks over which the beam spot is moved is counted, and in accordance with the position from which the beam spot has been moved and the number of the tracks, the optical head is located in the vicinity of the desired track.

In one aspect, due to the above configuration, it is difficult to perform the rough tracking faster than a predetermined speed since passage of tracks should be confirmed in order to count the number of the tracks.

In another aspect, since a polarization direction of the beam emerged from the objective lens to the optical disc is fixed with respect to the objective lens. However, if an angle formed between the polarized direction of the beam incident on a track and a tangential line to the track at the point where the beam is incident varies depending on the position of the optical head with respect to the optical disc. In such a case, quantity of the tracking error signal may change in accordance with the angle formed between the polarized direction of the beam incident on a track and a tangential line to the track at the point where the beam is incident, which affect the tracking error signal, and may prevent an accurate tracking operation.

SUMMARY OF THE INVENTION

It is therefore an object of the invention to provide an improved optical disc drive capable of performing the tracking operation at relatively high speed.

It is another object of the invention to provide an improved optical disc drive capable of performing a tracking operation accurately.

For the above objects, according to an aspect of the invention, there is provided an optical disc drive, provided with: an arm member carrying an objective optical system, the arm member being rotatable about an axis defined at one end portion, the objective optical system being provided at another end portion of the arm member; a light emitting system that emits light on the optical disc, via the objective optical system; a detecting system that receives light reflected by the optical disc via the objective optical system, a beam spot being formed on a light receiving surface of the detecting system, the detecting system detecting data related to an orientation of the beam spot with respect to the light receiving surface; and a control system which determines a current position of the arm member based on the data related to the orientation of the beam spot.

Since the rough tracking is performed by monitoring the orientation of the beam spot formed on the light receiving surface of the detecting system, and it becomes unnecessary to count the number of the tracks, the rough tracking can be performed at a relatively high speed.

Optionally, the control system performs a tracking operation by moving the arm member so that the current position coincides with a desired position.

Further optionally, the light receiving surface may include four light receiving areas arranged in matrix. The data related to the orientation of the beam spot may be obtained as a difference between a sum of amounts of light received by obliquely arranged two light receiving areas and a sum of amounts of light received by another obliquely arranged two light receiving areas.

Still optionally, the optical disc drive may include a deflecting optical system provided between the light emitting system and the objective optical system. The deflecting optical system deflects a light beam emitted by the light emitting system towards the objective optical system in order to change incident angle of the light beam incident on the objective optical system so that a position on the optical disc at which the light beam is incident is changed. With this configuration, a rough tracking may be performed by rotating the arm member without actuating the deflecting optical system, and a fine tracking may be performed by actuating the deflecting system without moving the arm member.

According to another aspect of the invention, there is provided an optical disc drive, which includes: an arm member carrying an objective optical system, the arm member being rotatable about an axis defined at one end portion, the objective optical system being provided at another end portion of the arm member; a light emitting system that emits light on the optical disc, via the objective optical system; a detecting system that receives light reflected by the optical disc via the objective optical system, a beam spot being formed on a light receiving surface of the detecting system, the detecting system detecting data related to an orientation of the beam spot with respect to the light receiving surface; an orientation changing device inserted in an optical path between the light emitting system and the objective optical system, the orientation changing device changing the orientation of the beam spot formed on the light receiving surface of the detecting system; and a control system which controls the orientation changing device to maintain a predetermined orientation of the beam spot with respect to the light receiving surface of the detecting system in accordance with the data related to the orientation of the beam spot detected by the detecting system.

According to a further aspect of the invention, there is provided an optical disc drive, which is provided with: an arm member carrying an objective optical system, the arm member being rotatable about an axis defined at one end portion, the objective optical system being provided at another end portion of the arm member; a light emitting system that emits light on the optical disc, via the objective optical system; a deflecting optical system provided between the light emitting system and the objective optical system, the deflecting optical system deflecting a light beam emitted by the light emitting system towards the objective optical system to change incident angle of the light beam incident on the objective optical system to change a position on the optical disc at which the light beam is incident; a detecting system that receives light reflected by the optical disc via the objective optical system, a beam spot being formed on a light receiving surface of the detecting system; a half-wave plate inserted in an optical path from the light emitting system to the objective optical system; a rotating mechanism for rotating the half-wave plate; and a control system which performs a rough tracking for positioning the beam spot at a position in the vicinity of a desired track without actuating the deflecting optical system and a fine tracking for accurately positioning the beam spot on the desired track by actuating the deflecting system without moving the arm member, the control system controlling the rotating mechanism to rotate the half-wave plate when the rough tracking is performed such that an orientation of the beam spot formed on the light receiving surface remains unchanged.

It is possible to maintain the orientation of the beam spot formed on the light receiving surface of the detecting system. Accordingly, when the conventional rough tracking operation is executed by rotating the arm member, the tracking operation is executed accurately.

Optionally, the light receiving surface may include four light receiving areas arranged in matrix, the data related to the orientation of the beam spot being obtained as a difference between a sum of amounts of light received by obliquely arranged two light receiving areas and a sum of amounts of light received by another obliquely arranged two light receiving areas.

DESCRIPTION OF THE ACCOMPANYING DRAWINGS

DESCRIPTION OF THE EMBODIMENT

Hereinafter, the invention will be described with reference to the accompanying drawings.

Firstly, an optical disc drive to which the each of the embodiments is applicable will be described.

Figure 1:
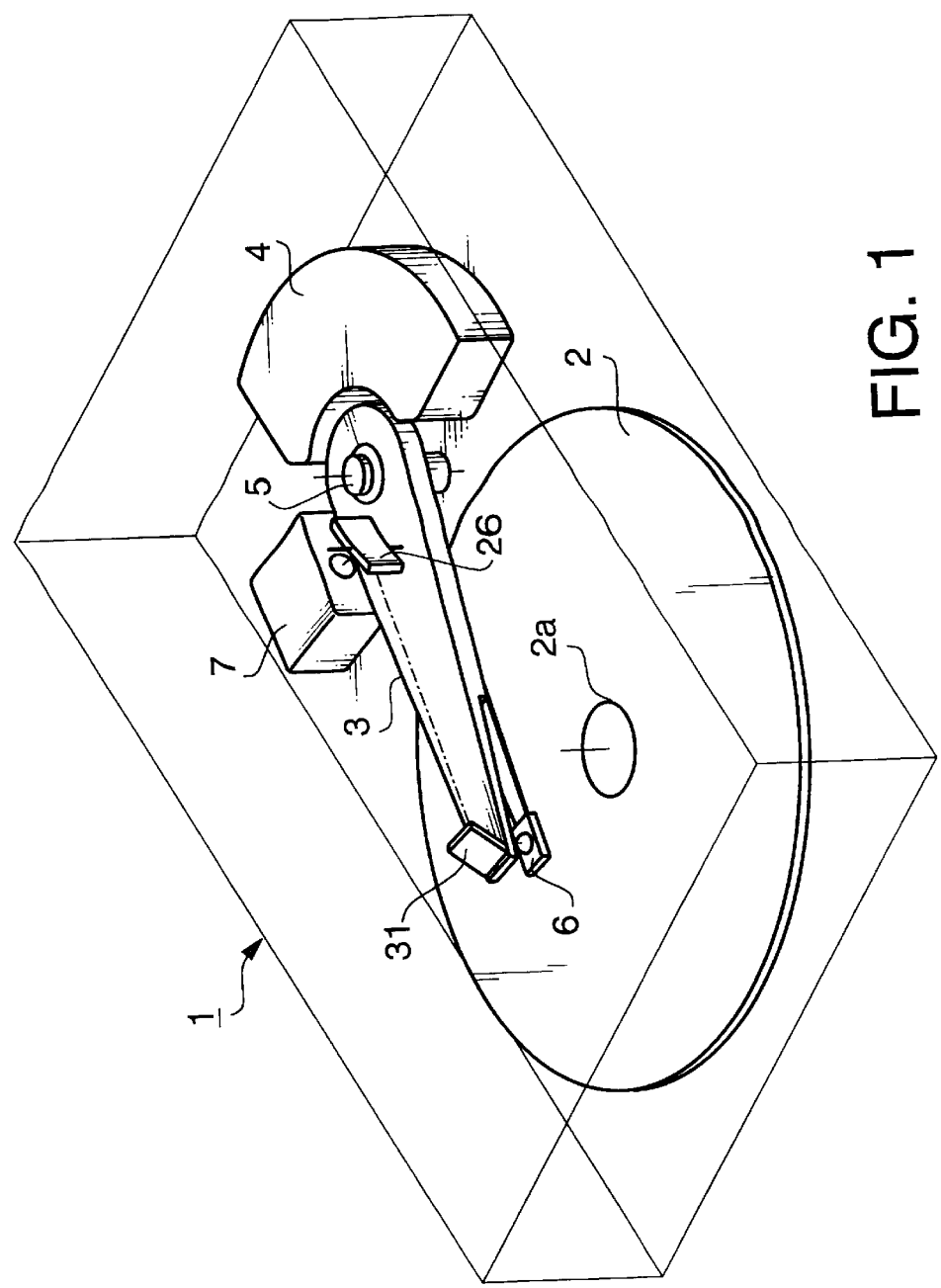
FIG. 1 is a perspective view of an optical disc drive to which first and the second embodiments of the present invention is embodied.

FIG. 1 is a perspective view of the optical disc drive (hereinafter, referred to as the disc drive) 1. The disc drive 1 is arranged to write/read data on/from an optical disc 2 by means of a so-called Near Field Recording (NFR) technology.

In the disc drive 1, the optical disc 2 is mounted on a rotating shaft 2a of a not-shown spindle motor. The disc drive 1 includes a rotary arm 3 extending in parallel to a surface of the optical disc 2, and is rotatably supported by a shaft 5. A floating head 6 that carries optical elements (described later) is provided at a tip of the rotary arm 3. When the rotary arm 3 is rotated, the floating head 6 moves across tracks formed on the optical disc 2. The rotary arm 3 is further provided with a light source module 7 in the vicinity of the shaft 5.

Figure 2:
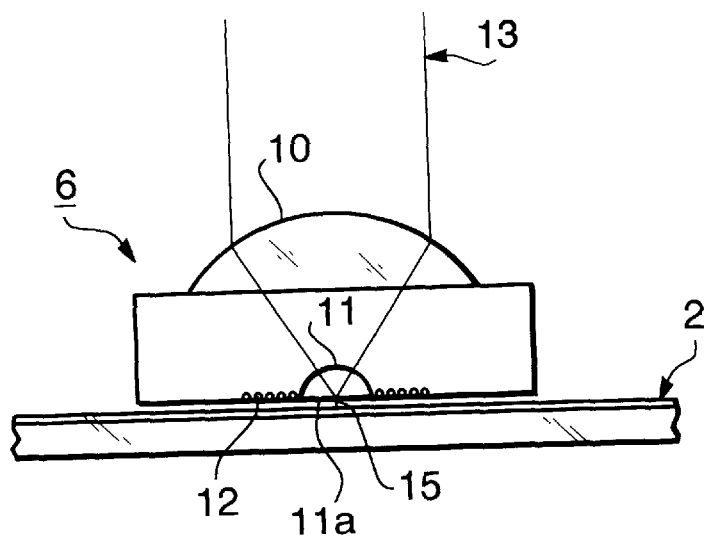
FIG. 2 is an enlarged view of a floating head of the optical disc drive of FIG. 1.
Figure 3:
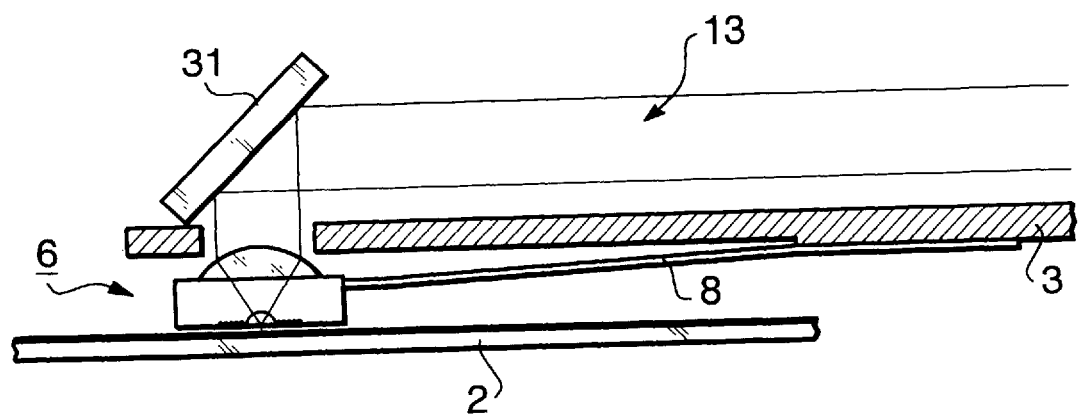
FIG. 3 is an enlarged view of the tip of the rotary arm of the optical disc drive of FIG. 1.

FIG. 2 is an enlarged view of the floating head 6, and FIG. 3 is an enlarged view of the tip of the rotary arm 3. As shown in FIG. 3, the floating head 6 is mounted on the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this configuration, the floating amount, with respect to the optical disc, of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens, the plane surface thereof facing the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 µm, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68,141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from the solid immersion lens 11 and the magnetic field generated by the coil 12.

Figure 4:
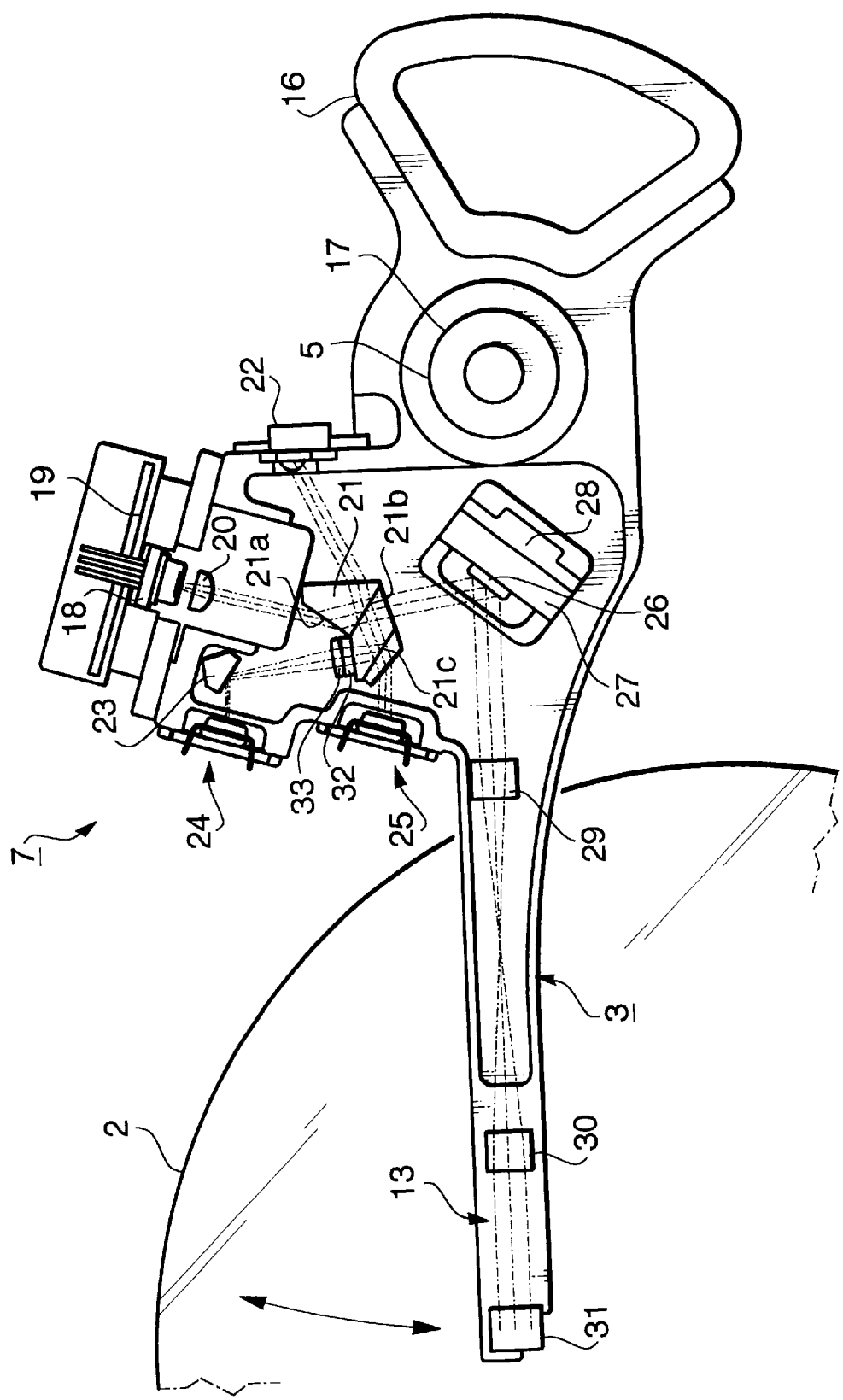
FIG. 4 is a top view of the rotary arm of the optical disc drive of FIG. 1.
Figure 5:
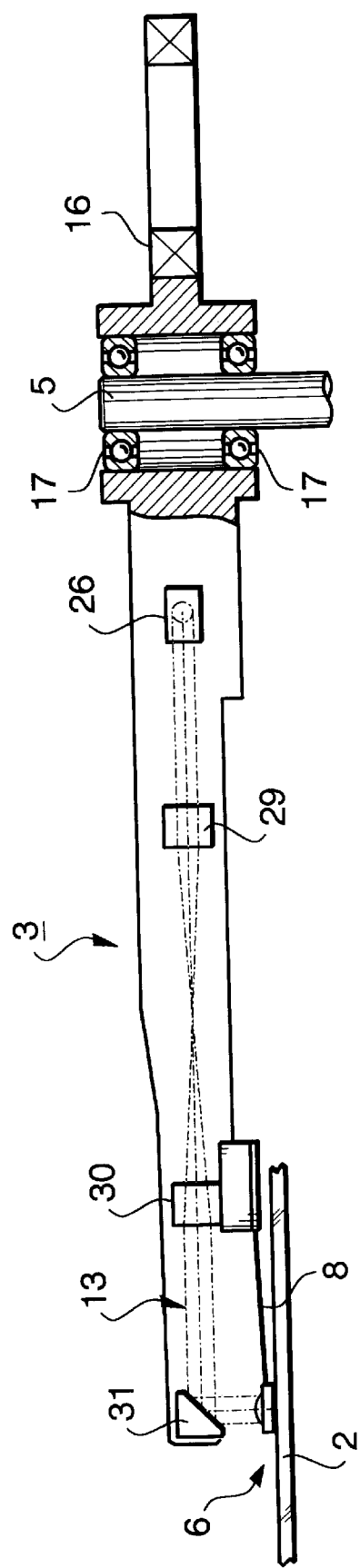
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the shaft 5, due to the electromagnetic induction.

As shown in FIGS. 4 and 5, the light source module 7 includes a laser diode 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the laser diode 18 is converted to a parallel laser beam by the collimator lens 20. Due to the characteristics of the laser diode 18, the sectional shape of the laser beam emitted by the laser diode 18 is elongated. In order to correct the sectional shape of the laser beam, an incident surface 21a of the composite prism assembly 21 is inclined with respect to the incident laser beam. When the laser beam having an elliptical cross section is refracted by the incident surface 21a of the composite prism assembly 21, the sectional shape of the laser beam becomes circular. The laser beam having the circular cross section enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the laser diode 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disc 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

Hereinafter, optical systems according to embodiments of the present invention will be described.

Figure 6:
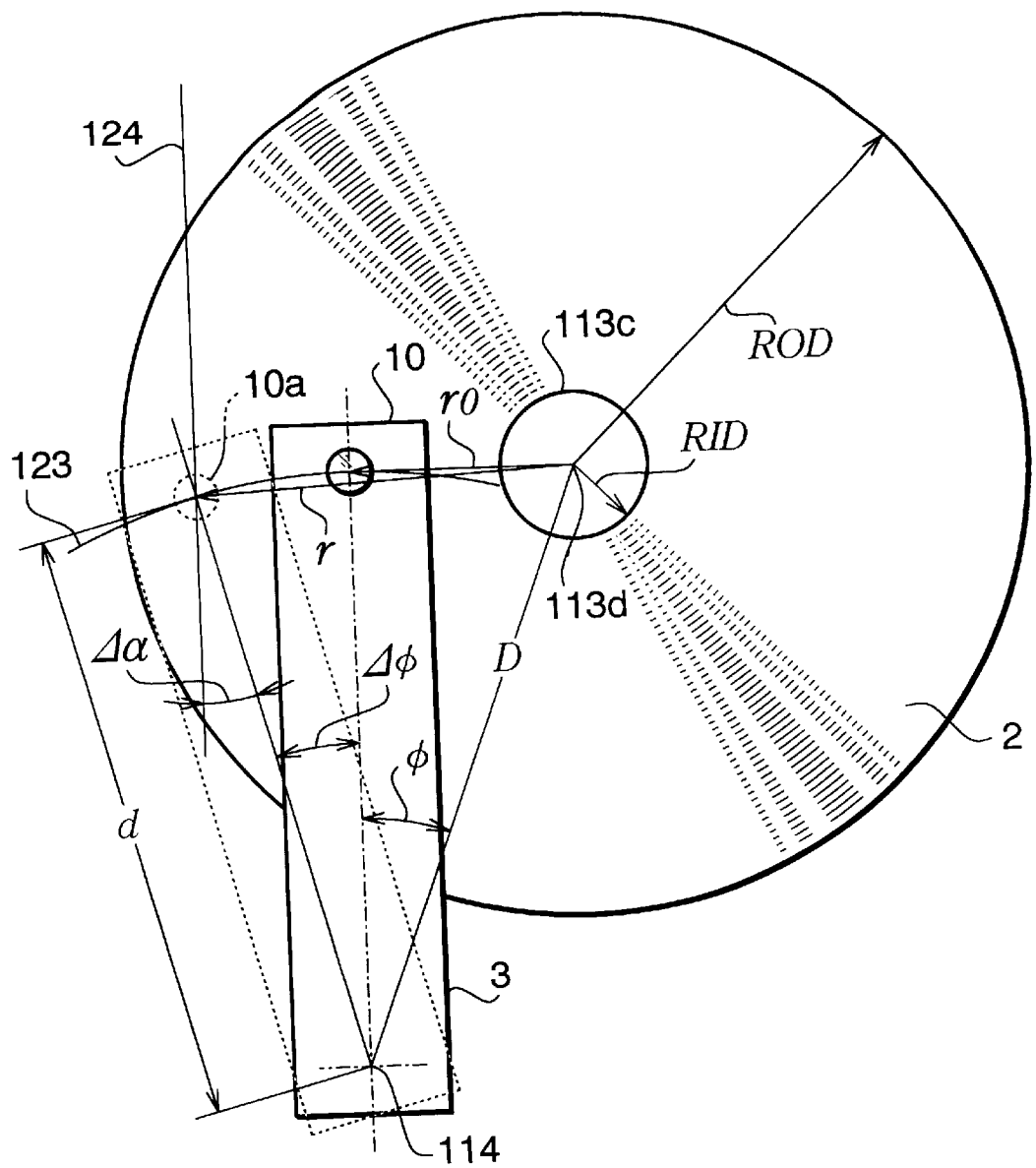
FIG. 6 illustrates change of orientation of a beam incident on the optical disc due to rotation of the rotary arm.

Firstly, with reference to FIG. 6, a change of an angle formed between the rotary arm 3 and a track will be described.

The optical disc 2 rotates about its rotation center 113d. The tracks of the optical disc 2 are formed within the data recording area which is defined between a circle whose diameter is RID and another circle whose diameter is ROD. The tracks formed on the data recording area are concentric circles. In the following description, for simplicity, it is assumed that a distance between the center 113d and the innermost track is RID, and a distance between the center 113d and the outermost track is ROD.

The laser beam is incident at a central portion on the objective lens 10. In FIG. 6, a line 123 represents a locus of the center of the objective lens, which forms a locus of an arc about a rotation axis 114 of the rotary arm 3 as the rotary arm 3 rotates.

An angle $\Delta\alpha$ formed between a tangential line to a track, on a point apart from the center 113d of the disc 2 by a distance "r", and on the locus 123, and a direction of the rotary arm 3 is expressed as indicated below. It should be noted that the direction of the rotary arm 3 is defined as a direction parallel to a line connecting the center 114 of the rotation of the rotary arm 3 and the center of the objective lens 10.

Firstly, a condition in which the angle $\Delta\alpha$ equals to 0 will be described. In FIG. 6, by solid lines, a position of the objective lens 10 when a tangential line of a track and the direction of the rotary arm are parallel to each other is indicated. This positional relationship is expressed by equation (1) below. $ro = \sqrt{D^2 - d^2}$ ; and $$\phi = \sin^{-1}\left(\frac{ro}{D}\right) \tag{1}$$

Where, ro is a distance from the center 113d of the disc 2 to the center of the objective lens 10, D is a distance between the center 113d and the center 114 of the rotation of the rotary arm 3, and d is a distance between the center 114 of the rotation of the rotary arm 3 and the center of the objective lens 10.

When the above conditions are satisfied, the tangential line is parallel to the direction of the rotary arm 3, and therefore the angle $\Delta\alpha$ is zero.

If the rotary arm 3 rotates by an angle of $\Delta\phi$, a position of the center of the objective lens 10 is to a position indicated by 10a, and a distance of the center of the objective lens 10 is represented by r, the following conditions (2) are satisfied.

$$\Delta \alpha = \frac{\pi}{2} - 2\sin^{-1}\left(\sqrt{\frac{(S-d)(S-r)}{dr}}\right), \quad (2)$$

$$\text{where } S = \frac{(d+D+r)}{2}$$

Figure 7:
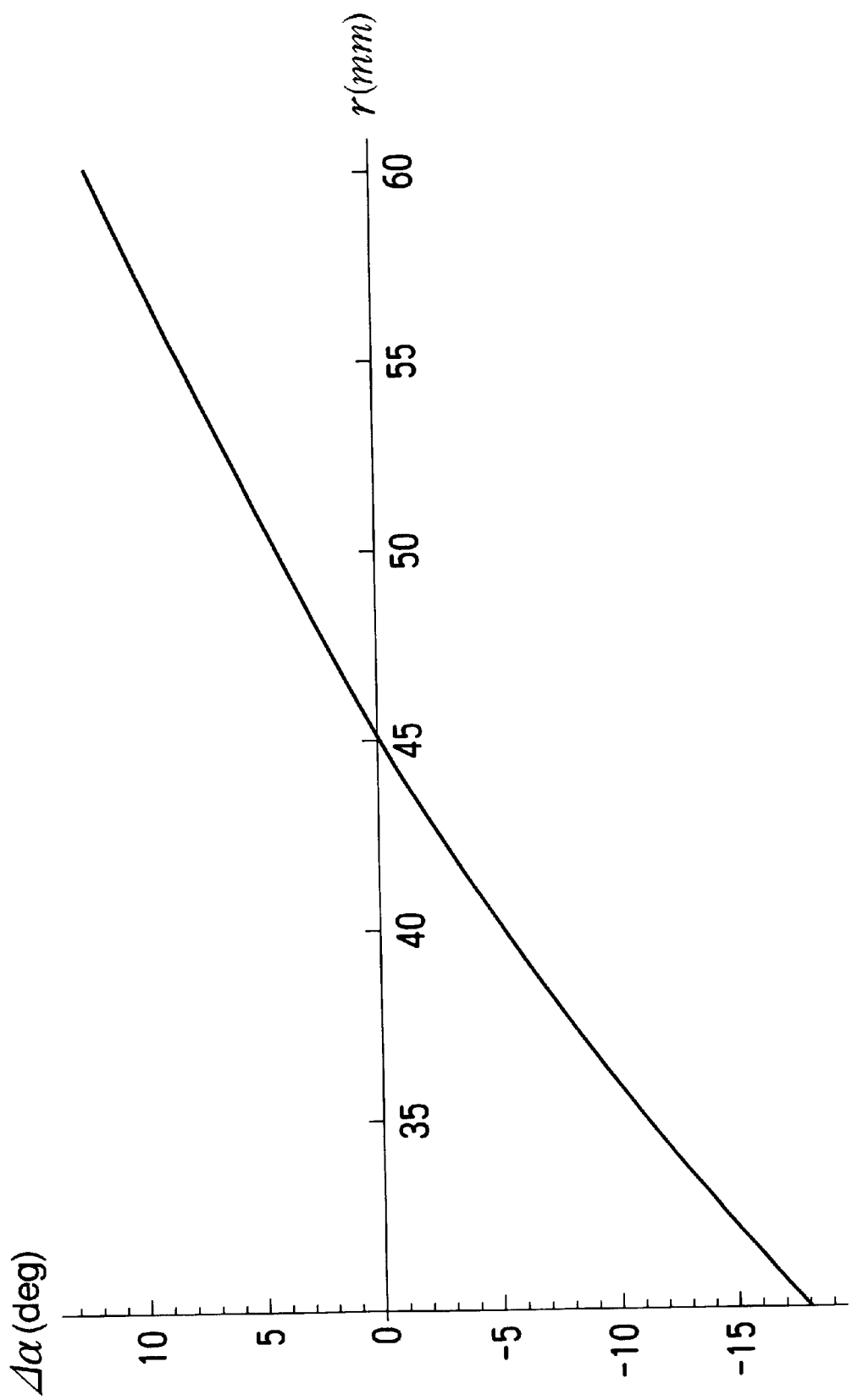
FIG. 7 shows a graph indicating a relationship between a distance of the beam spot and the center of the optical disc and the angle formed between the arm and a track.

For example, when d=60 mm, D=75 mm, RID=30 mm, ROD=60 mm, r0=45 mm and φ=36.8699 degrees, the relationship between the distance r and the angle Δα is indicated in a graph shown in FIG. 7.

It is known that diffraction light is generated in a direction perpendicular to the tangential line to the track. Accordingly, the angle Δα also represents a direction in which the diffraction light is generated.

Next, detection of the tracking error will be described with reference to FIG. 15.

Figure 15:
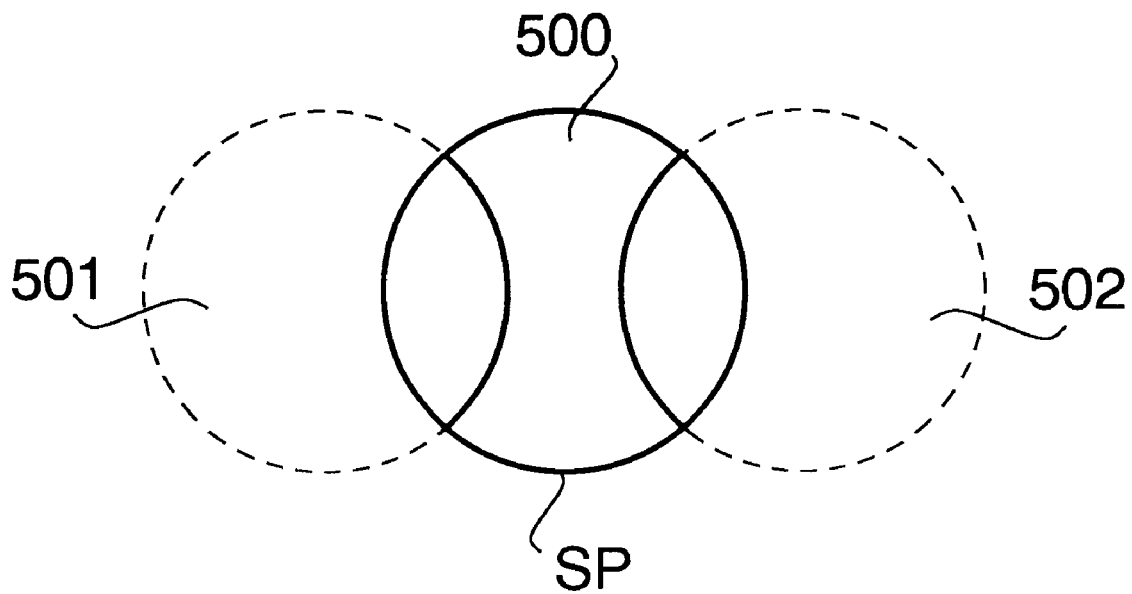
FIG. 15 shows an image patter of a beam spot formed on a tracking detection sensor.

FIG. 15 shows an image pattern of the beam spot SP formed on the tracking detection sensor 25. When a laser beam is incident on a surface of the disc 2 where a plurality of lands and grooves constituting tracks are formed, the grooves function as diffraction gratings. Accordingly, the reflected beam includes −1st and +1st order diffraction components as well as a 0-th order component. Since such a beam is incident on the tracking detection sensor 25, the pattern of the beam spot includes a circular area 500 formed by a 0-th order beam and portions where patterns 501 and 502 formed by −1st and +1st order beams which overlap the circular area 500. Depending on a positional relationship between the beam spot formed on the optical disc 2 and the track of the optical disc, intensity distribution of the portions 501 and 502 where the patterns formed by the −1st and +1st order beams overlap vary. Therefore, the spot is received by a photo diode having two light receiving areas, based on a difference between the light amount received by the two light receiving areas, the tracking error can be detected.

Figure 8:
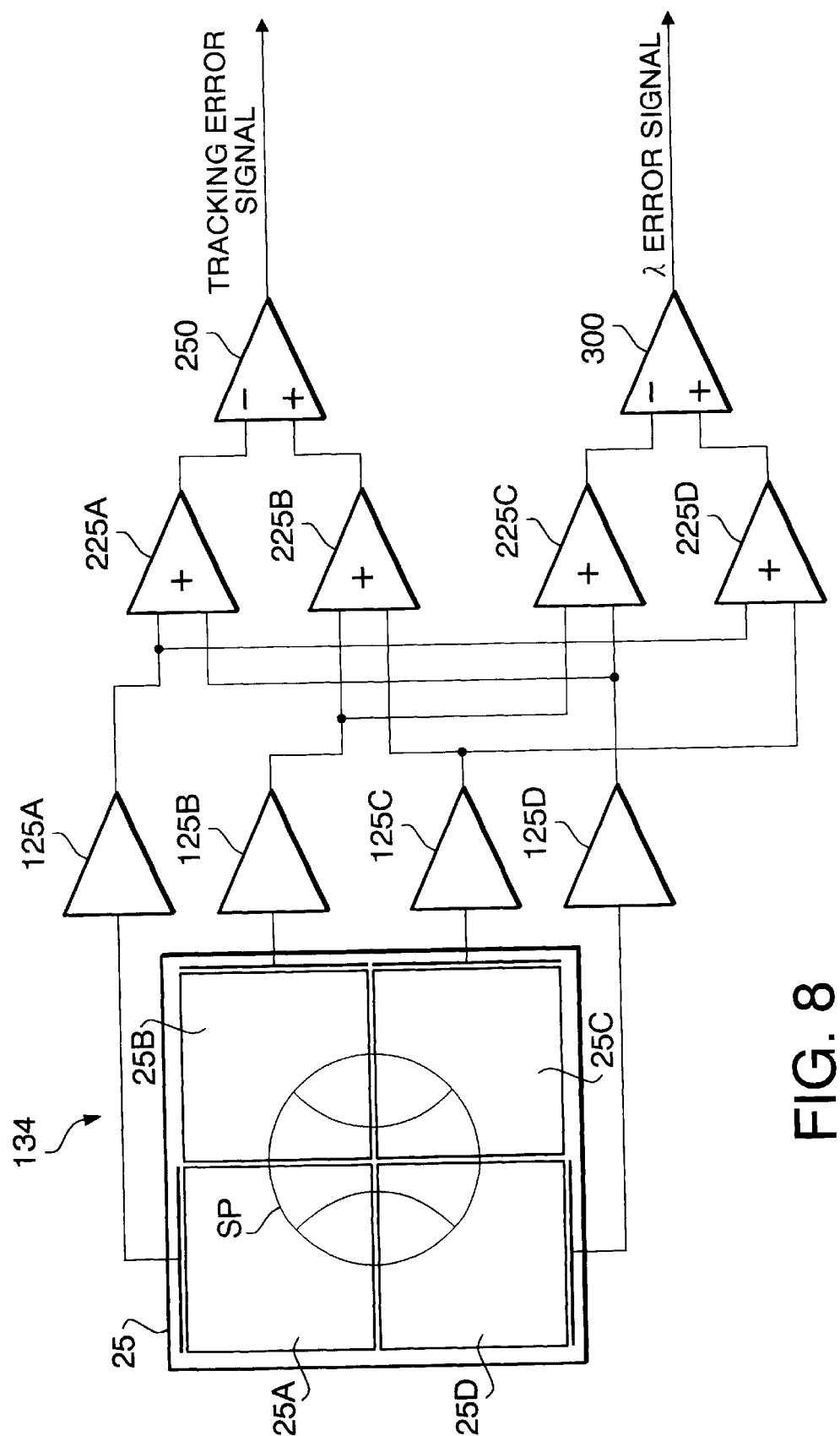
FIG. 8 is a block diagram of a detecting system for detecting a tracking error signal and a λ error signal.

FIG. 8 is a block diagram of a position detecting system 134. As shown in FIG. 8, the tracking detection sensor 25 has four light receiving areas 25A–25D. Output signals of the four light receiving areas 25A–25D are amplified by amplifiers 125A–125D, respectively. Output signals of the amplifiers 125A–125D are transmitted to adders 225A–225D such that:

- the output signals of the amplifiers 125A and 125D are added by the adder 225A;
- the output signals of the amplifiers 125B and 125C are added by the adder 225B;
- the output signals of the amplifiers 125B and 125D are added by the adder 225C; and
- the output signals of the amplifiers 125A and 125C are added by the adder 225D.

Output signals of the adders 225A and 225B are input to a differential amplifier 250, and output signals of the adders 225C and 225D are input to a differential amplifier 300.

Thus, the differential amplifier 250 outputs a signal representative of a difference between (a) a sum of the light received by the light receiving areas 25B and 25C, and (b) a sum of the light received by the light receiving areas 25A and 25D. This signal output by the differential amplifier 250 is used as a tracking error signal.

The differential amplifier 300 outputs a signal representative of a difference between (a) a sum of the light received by the light receiving areas 25A and 25C, and (b) a sum of the light received by the light receiving areas 25B and 25D. This signal output by the differential amplifier 300 is used as a λ error signal.

In FIG. 8, a spot SP when the rotary arm 3 is located at a reference position, where the angle Δα equals 0, is indicated.

Figure 9:
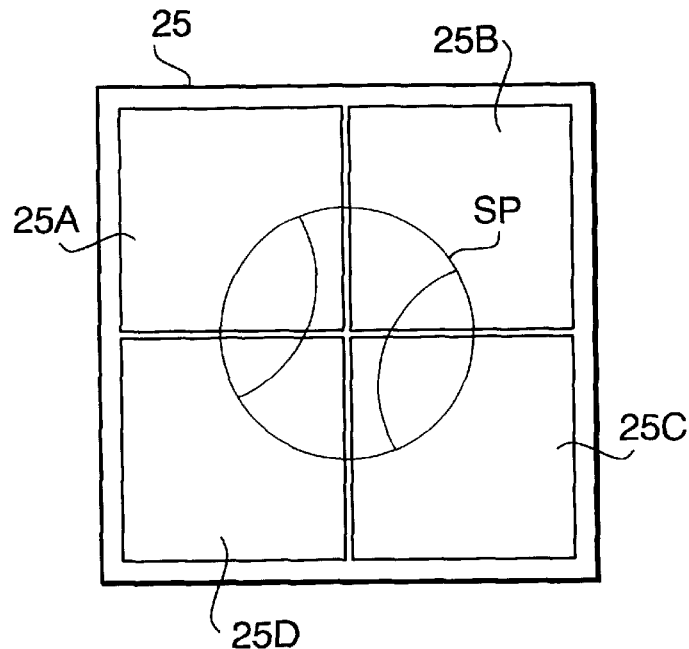
FIG. 9 shows an orientation of the beam spot when the optical head is located at an inner track.
Figure 10:
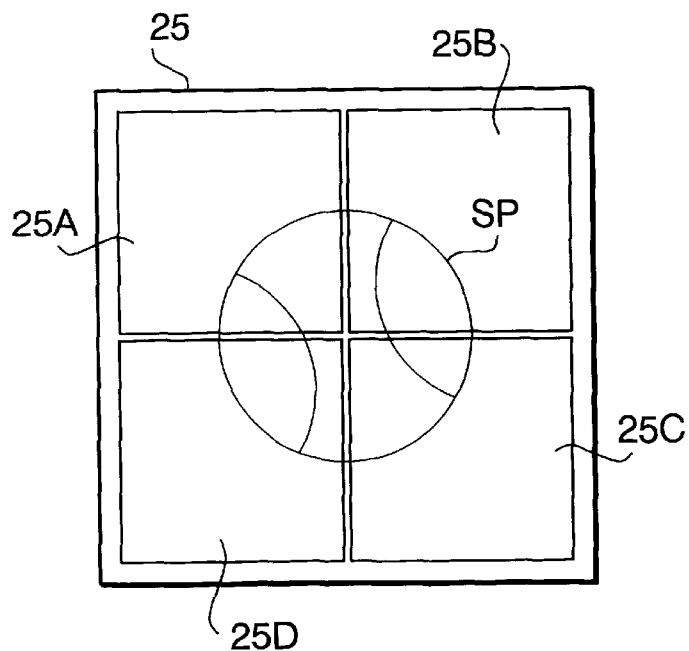
FIG. 10 shows an orientation of the beam spot when the optical head is located at on outer track.
Figure 11:
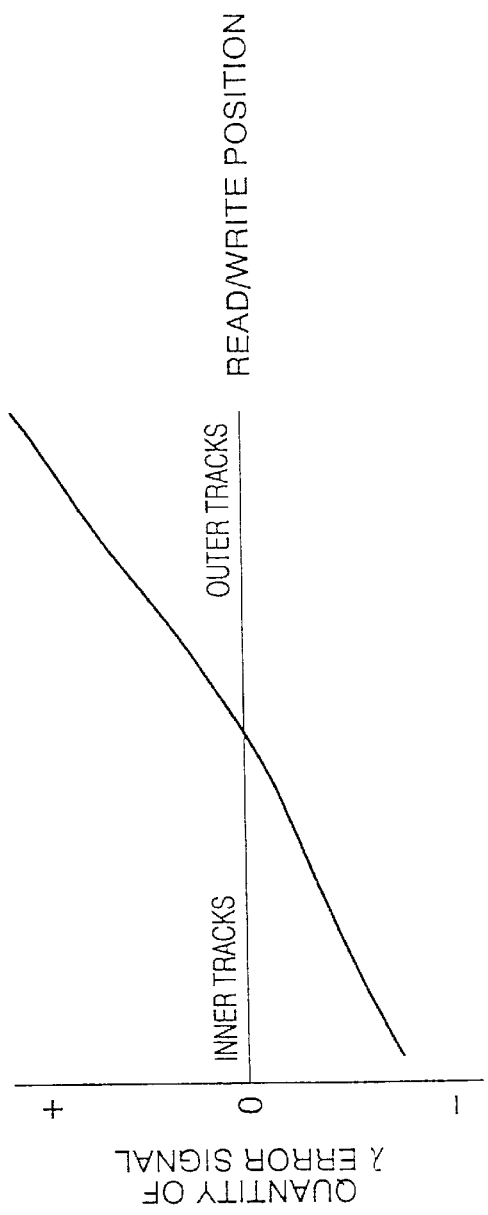
FIG. 11 shows a graph indicating a relationship between the λ error signal with respect to a position of the rotary arm.

When the rotary arm 3 is located on the inner side of the disc 2 with respect to the reference position, the spot SP formed on the light receiving areas 25A–25D is inclined as shown in FIG. 9. FIG. 10 shows a situation where the rotary arm 3 is located on the outer side of the disc 2 with respect to the reference position.

As shown in FIGS. 8–10, the spot SP formed on the light receiving areas 25A–25D has a predetermined image pattern representative of the direction in which the diffraction light is generated. When the rotary arm 3 rotates, the orientation of the spot SP with respect to the light receiving areas 25A–25D changes.

Accordingly, by detecting the orientation of the spot SP with respect to the light receiving areas 25A–25D, a position of the rotary arm 3 can be detected. Specifically, if the galvano mirror 26 is located at a predetermined position, in accordance with the output signal of the differential amplifier 300, the rough tracking operation, i.e., rotary movement of the rotary arm 3, can be controlled.

In a first embodiment, the rough tracking is performed with reference to the orientation of the spot SP. Since the orientation of the spot SP corresponds to the position of the rotary arm 3, based only on the orientation of the spot SP, it is possible to identify the current position of the rotary arm 3.

Figure 12:
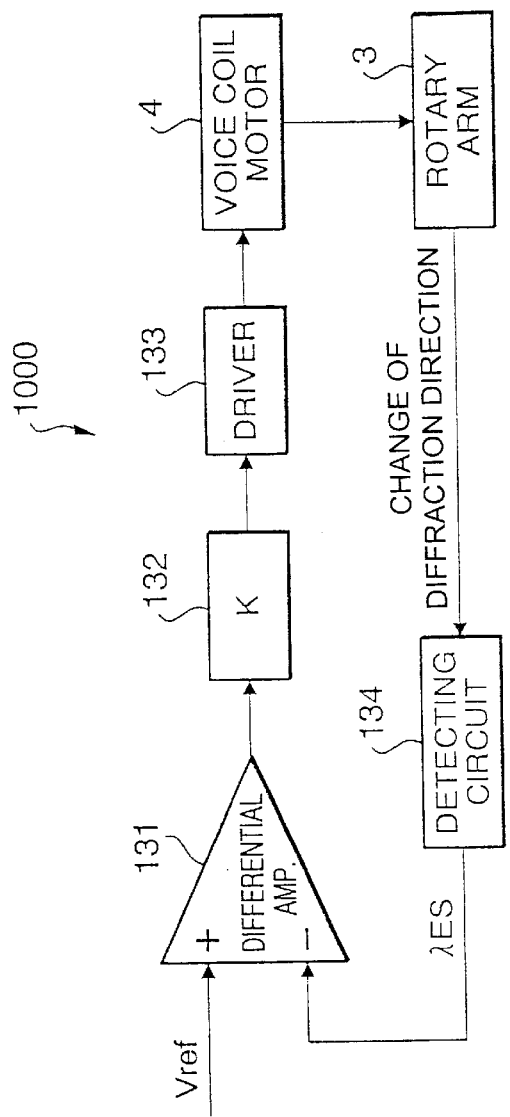
FIG. 12 is a block diagram of a control system for performing a rough tracking.

FIG. 12 is a block diagram showing a control system, according to the first embodiment, for executing the rough tracking operation with reference to the output signal of the differential amplifier 300.

As shown in FIG. 12, the control system includes a differential amplifier 131, an amplifier 132, a driver 133 for driving the voice coil motor 4, and the detection system 134 described above.

Firstly, a voltage Vref corresponding to a position to which the rotary arm 3 is moved is applied to an non-inverted input terminal of the differential amplifier 131. To an inverted input terminal, a λES signal, which corresponds to a current position of the rotary arm 3 is input. The differential amplifier 131 output a signal representing a difference between the voltage Vref and the λES signal, which is amplified by the amplifier 132 having an amplification ratio of K. The output of the amplifier 132 is input to the driver 133. The driver 133 drives the voice coil motor, i.e., generates the current flow in the voice coil motor 4, in accordance with the output of the amplifier 132, to rotate the rotary arm 3. The rotated amount of the rotary arm 3 is detected, as described above, using the detecting system 134, and the λES signal, i.e., the signal representing the position of the rotary arm 3. Until the λES signal equals to the voltage Vref, the above operation for driving the rotary arm is continued. Thus, finally, the rotary arm 3 is located at a target position, at which the detecting system 134 outputs the λES signal that is equal to the voltage Vref.

As described above, according to the first embodiment, since the rough tracking is performed by monitoring the beam spot formed on the tracking detection sensor 25, the rough tracking can be performed at a relatively high speed. After the rough tracking has been done, then by rotating the galvano mirror 26, the fine tracking operation can also be performed by rotating the galvano mirror 26.

Figure 13:
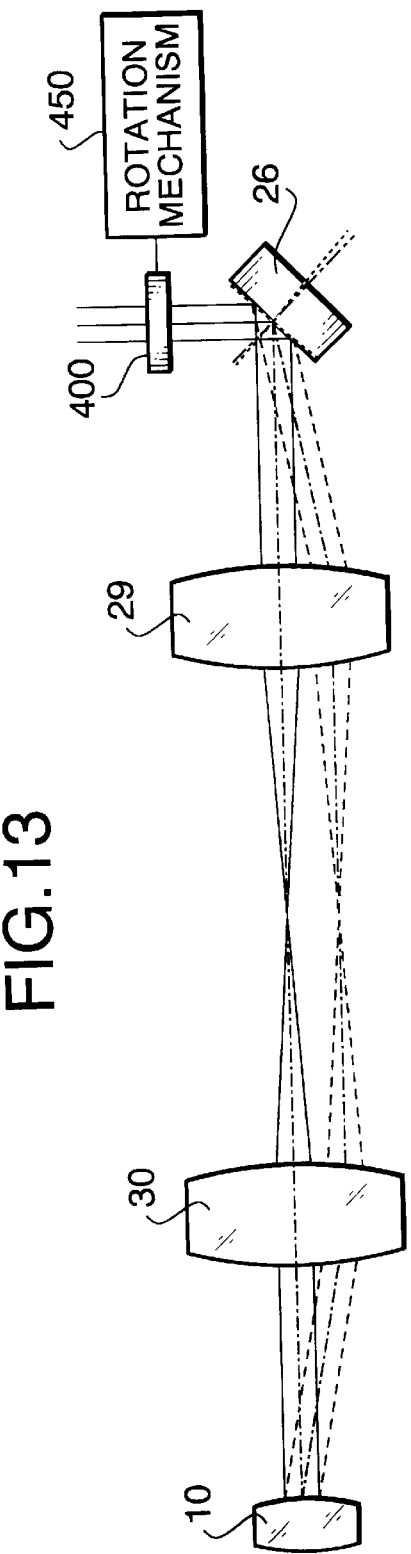
FIG. 13 is an optical system according to a second embodiment of the invention.

FIG. 13 shows an optical system according to a second embodiment of the invention.

In the second embodiment, the structure of the detecting system is similar to that employed in the first embodiment.

That is, the detecting system has, as shown in FIG. 8, the tracking sensor 25 having four light receiving areas 25A–25D, four amplifiers 125A–125D, four adders 225A–225D, and two differential amplifiers 250 and 300.

Further to the above, in the second embodiment, a rotatable half-wave plate 400 is provided.

As shown in FIG. 13, the half-wave plate 400 is provided between the composite prism assembly 21 and the galvano mirror 26. The half-wave plate 400 is supported by a not-shown supporting member which rotatably supports the half-wave plate 400. The optical system is further provided with a rotating mechanism 450 for rotating the half-wave plate 400. Due to the presence of the half-wave plate 400, the polarization of the beam incident onto the optical disc with respect to a line tangential to a track of the optical disc at a position at which the beam is incident can be maintained constant.

Figure 14:
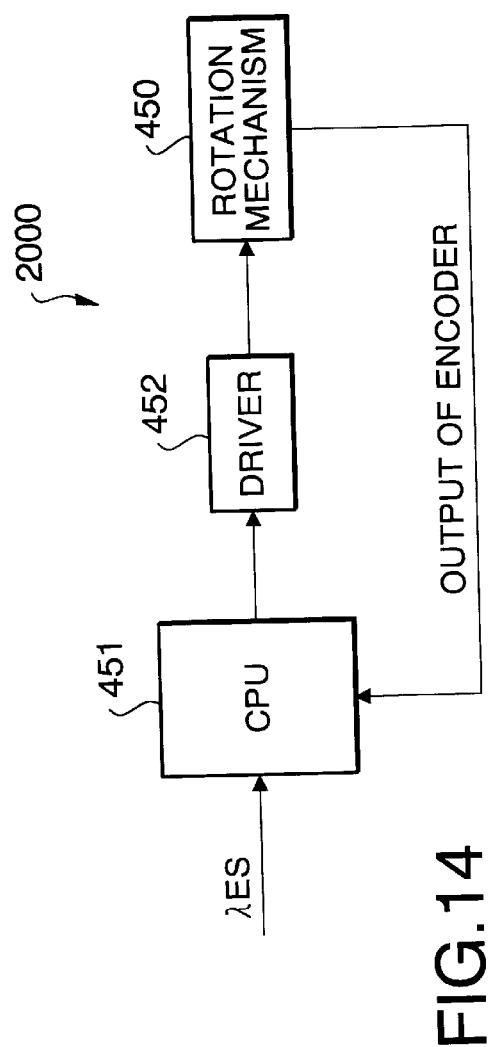
FIG. 14 is a block diagram of a control system for rotating a half-wave plate according to the second embodiment.

FIG. 14 is a block diagram of a control system 2000 employed in the second embodiment. The control system includes a CPU (Central Processing Unit) 451, a driver 452, and the rotating mechanism 450.

To the CPU 451, the λES signal, i.e., the signal representing the orientation of the spot SP formed on the sensor 25 is input. The CPU 451 controls the driver 452 to drive the rotating mechanism 450. The rotating mechanism 450 is provided with an encoder (not shown) for indicating the rotational position of the half-wave plate 400, which is also input to the CPU 451. Thus, the CPU 451 controls, based on the input λES signal and the signal output by the encoder, the rotating mechanism 450 so that the orientation of the spot SP with respect to the four light receiving areas 25A–25D is set to a predetermined state, for example, as shown in FIG. 8.

As described above, according to the second embodiment, it is possible to maintain the angle formed between the polarized direction of the incident beam and the tangential line to a track at a position where the beam is incident. Accordingly, when the conventional rough tracking operation is executed, the tracking operation is executed accurately.

The present disclosure relates to the subject matters contained in Japanese Patent Applications No. HEI 09-318995, filed on Nov. 5, 1997, and No. HEI 09-322421, filed on Nov. 8, 1997, which are expressly incorporated herein by reference in their entireties.

What is claimed is:

1. An optical disc drive, comprising:
   an arm member carrying an objective optical system, said arm member being rotatable about an axis defined at one end portion of said arm member, said objective optical system being provided at another end portion of said arm member;
   a light emitting system that emits lights on an optical disc, via said objective optical system;
   a detecting system that receives light reflected by the optical disc via said objective optical system, a beam spot being formed on a light receiving surface of said detecting system, said detecting system detecting data related to an orientation of said beam spot with respect to said light receiving surface,the orientation of said beam spot corresponding to a rotational position of said arm member, and
   a control system which determines a current position of said arm member based on said data related to the orientation of said beam spot.

2. The optical disc drive according to claim 1, wherein said control system performs a tracking operation by moving said arm member so that said current position coincides with a desired position.

3. The optical disc drive according to claim 1, wherein said light receiving surface includes four light receiving areas arranged in a matrix, said data related to the orientation of said beam spot being obtained as a difference between a sum of amounts of light received by two obliquely arranged light receiving areas and a sum of amounts of light received by another two obliquely arranged light receiving areas.

4. The optical disc drive according to claim 3, further comprising a deflecting optical system provided between said light emitting system and said objective optical system, said deflecting optical system deflecting a light beam emitted by said light emitting system towards said objective optical system to change incident angle of the light beam incident on said objective optical system to change a position on said optical disc at which the light beam is incident, a rough tracking being performed by rotating said arm member without actuating said deflecting optical system, and a fine tracking being performed by actuating said deflecting system without moving said arm member.

5. An optical disc drive, comprising:
   an arm member carrying an objective optical system, said arm member being rotatable about an axis defined at one end portion of said arm member, said objective optical system being provided at another end portion of said arm member;
   a light emitting system that emits light on an optical disc, via said objective optical system;
   a detecting system that receives light reflected by said optical disc via said objective optical system, a beam spot being formed on a light receiving surface of said detecting system, said detecting system detecting data related to an orientation of said beam spot with respect to said light receiving surface, said data related to an orientation of said beam spot corresponding to a rotational position of said arm member;
   a polarization direction changing device positioned along an optical path between said light emitting system and said objective optical system, said polarization direction changing device changing a direction of polarization of an incident beam with respect to a line tangential to a track at a position where the beam is incident; and
   a control system which drives said polarization direction changing device to maintain a predetermined polarization direction with respect to the tangential line based on said data related to the orientation of said beam spot regardless of the rotational position of said arm member.

6. An optical disc drive, comprising:
   an arm member carrying an objective optical system, said arm member being rotatable about an axis defined at one end portion of said arm member, said objective optical system being provided at another end portion of said arm member;
   a light emitting system that emits light on an optical disc, via said objective optical system;
   a deflecting optical system provided between said light emitting system and said objective optical system, said deflecting optical system deflecting a light beam emitted by said light emitting system towards said objective optical system to change an incident angle of the light beam incident on said objective optical system to change a position on said optical disc at which the light beam is incident;
   a detecting system that receives light reflected by said optical disc via said objective optical system, a beam spot being formed on a light receiving surface of said detecting system, said detecting system detecting data related to an orientation of said beam spot with respect to said light receiving surface, said data related to an orientation of said beam spot corresponding to a rotational position of said arm member;

a half-wave plate positioned along a optical path between said light emitting system and said objective optical system;

a rotating mechanism for rotating said half-wave plate; and a control system which performs a rough tracking for positioning said beam spot at a position in the vicinity of a desired track without actuating said deflecting optical system and a fine tracking for accurately positioning said beam spot on the desired track by actuating said deflecting system without moving said arm member, said control system controlling said rotating mechanism to rotate said half-wave plate when said rough tracking is performed so as to maintain a predetermined direction of polarization of an incident beam with respect to a line tangential to a track of the optical disc at a position where the beam is incident, based on said data related to the orientation of said beam spot, regardless of the rotational position of said arm member.

7. The optical disc drive according to claim 6, wherein said light receiving surface includes four light receiving areas arranged in a matrix, said data related to the orientation of said beam spot being obtained as a difference between a sum of amounts of light received by two obliquely arranged light receiving areas and a sum of amounts of light received by another two obliquely arranged light receiving areas.

8. An optical disc drive, comprising:

an arm member carrying an objective optical system, said arm member being rotatable about an axis defined at one end portion of said arm, said objective optical system being provided at another end portion of said arm member;

a light emitting system that emits light on an optical disc, via said objective optical system;

a detecting system that receives light reflected by an optical disc via said objective optical system, a beam spot being formed on a light receiving surface of said detecting system, said detecting system detecting data related to an orientation of said beam spot with respect to said light receiving surface, said data related to an orientation of said beam spot corresponding to a rotational position of said arm member; and a control system that controls a rotational position of said arm member based on said data related to the orientation of said beam spot.

* * * * *